US012737633B2

(12) United States Patent
Rawat et al.

(10) Patent No.: US 12,737,633 B2
(45) Date of Patent: Sep. 15, 2026

(54) TRAINING A FEDERATED GENERATIVE ADVERSARIAL NETWORK

(71) Applicant: INTERNATIONAL BUSINESS MACHINES CORPORATION, Armonk, NY (US)

(72) Inventors: Ambrish Rawat, Dublin (IE); Killian Levacher, Dublin (IE); Giulio Zizzo, Dublin (IE); Ngoc Minh Tran, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 18/063,813

(22) Filed: Dec. 9, 2022

(65) Prior Publication Data

US 2024/0193428 A1 Jun. 13, 2024

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ............................... G06N 3/088; G06N 3/045
USPC ............................................................ 706/25
See application file for complete search history.

(56) References Cited

U.S. PATENT DOCUMENTS

2021/0192078 A1 6/2021 Cosman
2021/0360010 A1 11/2021 Zaccak
2022/0261697 A1* 8/2022 Chopra .................... H04L 9/008
2023/0186098 A1* 6/2023 Chang .................... G06N 3/045 706/25
2023/0196115 A1* 6/2023 Arnon ...................... G06N 3/08 706/25

OTHER PUBLICATIONS

Nguyen et al, "Federated Learning for COVID-19 Detection With Generative Adversarial Networks in Edge Cloud Computing", Jun. 2022 (Year: 2022).*
Xia et al, "Local and Global Perception Generative Adversarial Network for Facial Expression Synthesis", Mar. 2022 (Year: 2022).*
Zeng et al., "Privacy-Enhanced Federated Generative Adversarial Networks for Internet of Things", Date of Publication May 2022 (Year: 2022).*

(Continued)

*Primary Examiner* — Abdullah Al Kawsar
*Assistant Examiner* — Jun Kwon
(74) *Attorney, Agent, or Firm* — Elliot J. Shine

(57) ABSTRACT

A method, computer system, and computer program product are provided for training a federated generative adversarial network (GAN) using private data. The method is carried out at an aggregator system having a generator and a discriminator, wherein the aggregator system is in communication with multiple participant systems each having a local feature extractor and a local discriminator. The method includes: receiving, from a feature extractor at a participant system, a set of features for input to the discriminator at the aggregator system, wherein the features include features extracted from private data that is private to the participant system; and receiving, from one or more local discriminators of the participant systems, discriminator parameter updates to update the discriminator at the aggregator system, wherein the local discriminators are trained at the participant systems.

12 Claims, 6 Drawing Sheets

(56) References Cited

OTHER PUBLICATIONS

Ndubuaku "Edge-enhanced analytics via latent space dimensionality reduction", 2020 (Year: 2020).*
Aslett, et al., "A Review of Homomorphic Encryption and Software Tools for Encrypted Statistical Machine Learning." Published Aug. 2015 by ResearchGate. 22 pages. https://www.researchgate.net/publication/281312377_A_review_of_homomorphic_encryption_and_software_tools_for_encrypted_statistical_machine_learning.
Bonawitz, et al., "Practical Secure Aggregation for Privacy-Preserving Machine Learning." Accessed Oct. 5, 2022. 21 pages. Published by IACR. https://eprint.iacr.org/2017/281.pdf.
Hardy, et al., "Private Federated Learning on Vertically Partitioned Data via Entity Resolution and Additively Homomorphic Encryption." Published Nov. 29, 2017 by Arxiv. 60 pages. https://arxiv.org/pdf/1711.10677.pdf.
Kantarcioglu, et al., "Privacy-Preserving Distributed Mining of Association Rules on Horizontally Partitioned Data." Published Sep. 2004 by IEEE. 12 pages. In IEEE Transactions on Knowledge and Data Engineering, vol. 16, No. 9. https://personal.utdallas.edu/~muratk/publications/tkde04.pdf.
Mangasarian, O., "Privacy-Preserving Classification of Horizontally Partitioned Data via Random Kernels." Published Jan. 2008 by Research Gate. 11 pages. In Proceedings of the 2008 International Conference on Data Mining, DMIN 2008, Jul. 14-17, 2008, Las Vegas, USA, 2 Volumes. https://www.researchgate.net/publication/220705143_Privacy-Preserving_Classification_of_Horizontally_Partitioned_Data_via_Random_Kernels.
Nguyen, et al., "Federated Learning for COVID-19 Detection with Generative Adversarial Networks in Edge Cloud Computing." Published Oct. 14, 2021 by Arxiv. 14 pages. https://arxiv.org/abs/2110.07136v1.
Que, et al., "A Collaborative Framework for Distributed Privacy-Preserving Support Vector Machine Learning." Published Nov. 3, 2012 by NCBI. 10 pages. In AMIA Annu Symp Proc. 2012; 2012: pp. 1350-1359. https://www.ncbi.nlm.nih.gov/pmc/articles/PMC3540462/.
Schein, et al., "Locally Private Bayesian Inference for Count Models." Published Feb. 21, 2019 by Arxiv. 10 pages. https://arxiv.org/abs/1803.08471.
Sweeney, et al., "A Multiparty Computation for Randomly Ordering Players and Making Random Selections." Published in 2004 by Semantic Scholar. 39 pages. https://www.semanticscholar.org/paper/A-Multiparty-Computation-for-Randomly-Ordering-and-Sweeney-Shamos/81d30d9e6c0e3b4c42462a46a6e861cdaf245df0.
Torra, V., "Random dictatorship for privacy-preserving social choice." Published Oct. 2020 by Springer. 10 pages. In International Journal of Information Security. 19. https://www.researchgate.net/publication/336590266_Random_dictatorship_for_privacy-preserving_social_choice.
Wan, et al., "Privacy-Preservation for Gradient Descent Methods." Published Aug. 2007 by ACM. 9 pages. https://citeseerx.ist.psu.edu/viewdoc/download?doi=10.1.1.124.3885&rep=rep1&type=pdf.
Wu, et al., "FedCG: Leverage Conditional GAN for Protecting Privacy and Maintaining Competitive Performance in Federated Learning." Published Feb. 16, 2022 by Arxiv. 8 pages. https://arxiv.org/pdf/2111.08211.pdf.
Yang, et al., "Federated Machine Learning: Concept and Applications." Published Feb. 13, 2019 by Arxiv. 19 pages. https://arxiv.org/pdf/1902.04885.pdf.
Yu, et al., "Privacy-Preserving SVM Classification on Vertically Partitioned Data." Published in 2006 by Springer. 10 pages. http://citeseerx.ist.psu.edu/viewdoc/download?doi=10.1.1.309.361&rep=rep1&type=pdf.
Zhang, et al., "Training Federated GANs with Theoretical Guarantees: A Universal Aggregation Approach." Published Feb. 9, 2021 by Arxiv. 26 pages. https://arxiv.org/abs/2102.04655.
Rasouli, "FedGAN: Federated Generative Adversarial Networks for Distributed Data." Published Jun. 15, 2020 by Arxiv. 23 pages. https://arxiv.org/abs/2006.07228.

* cited by examiner

200

PARTICIPANT SYSTEMS 210

TRAIN LOCAL FEATURE EXTRACTORS OVER PARTITIONS OF PRIVATE AND PUBLIC REAL DATA 211

OBTAIN COPY OF FAKE DATA FROM AGGREGATOR 212

USE THEIR LOCAL FEATURE EXTRACTOR TO OBTAIN FEATURES FOR ALL THE COLLECTED REAL AND FAKE DATA 213

EXTRACT FEATURES AND PASS TO AGGREGATOR 214

FEATURE REPRESENTATIONS OF LOCAL DATASETS SHARED BETWEEN PARTICIPANTS 215

USE REAL AND FAKE FEATURES TO UPDATE LOCAL DISCRIMINATOR 216

DISPATCH GRADIENTS FROM LOCAL DISCRIMINATORS TO AGGREGATOR 217

DISPATCH DISCRIMINATOR PARAMETER UPDATES TO AGGREGATOR 218

AGGREGATOR SYSTEM 220

GENERATOR PRODUCES FAKE DATA 221

PASSES FAKE DATA TO PARTICIPANTS 222

RECEIVES AND COMBINES OUTPUT OF ALL LOCAL FEATURE EXTRACTORS AND INPUTS TO DISCRIMINATOR 223

UPDATES GENERATOR WITH GRADIENTS OBTAINED BY FEEDING FEATURES INTO LOCAL DISCRIMINATORS 224

UPDATES DISCRIMINATOR WITH PARAMETER UPDATES 225

COMBINES PARAMETER UPDATES FOR GAN DISCRIMINATOR AND BROADCASTS TO PARTICIPANTS' LOCAL DISCRIMINATORS 226

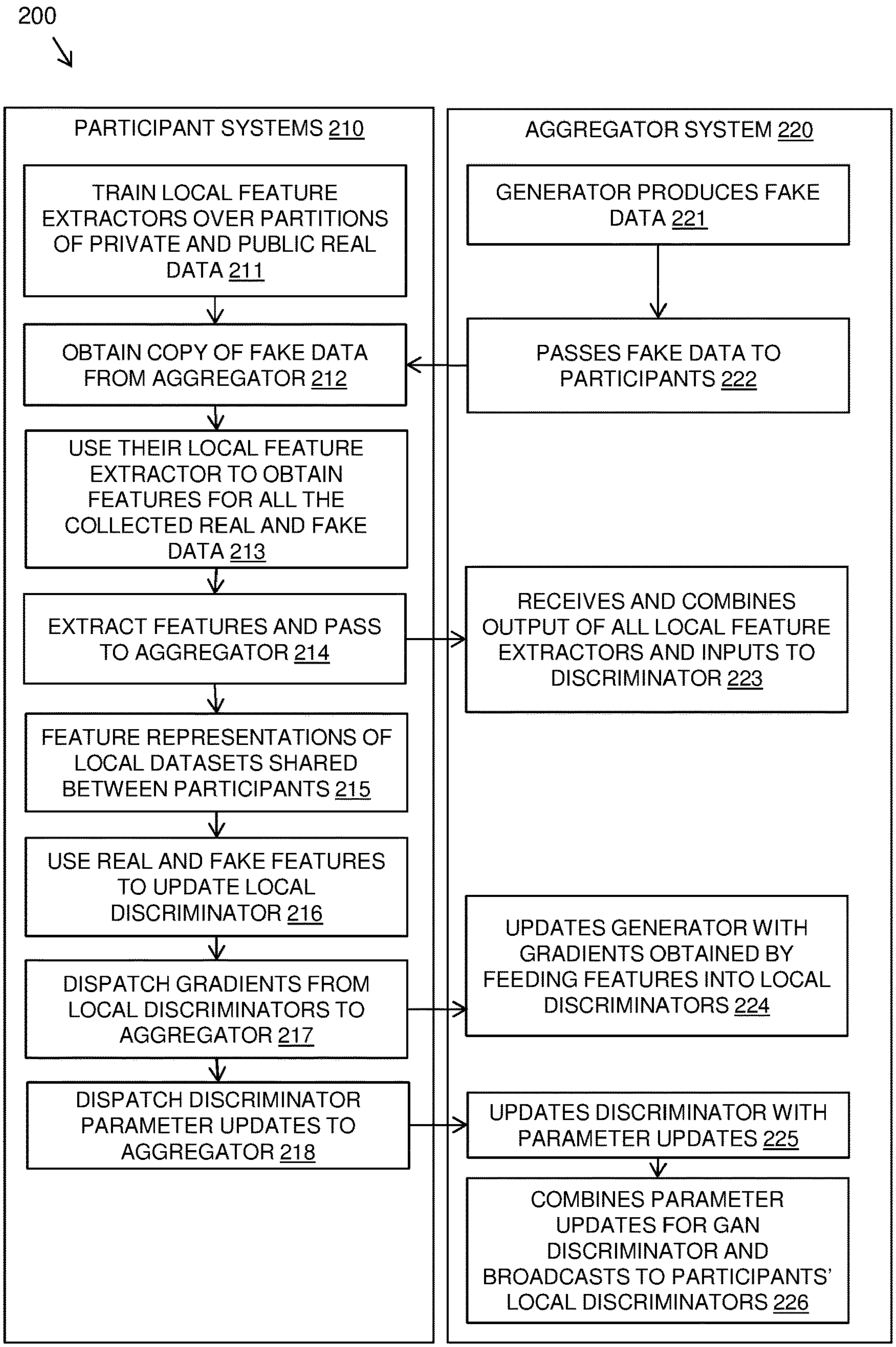

*FIG. 2*

TRAINING A FEDERATED GENERATIVE ADVERSARIAL NETWORK

BACKGROUND

The present invention relates to federated Generative Adversarial Networks (GANs), and more specifically, to training a federated GAN using private data.

Data is often distributed across different departments within an organization or across different corporations. Often, such data cannot be transferred across some boundaries because of legal obligations or internal Governance, Risk and Compliance (GRC) controls.

When using artificial intelligence (AI) to make organizational or business processes more efficient and/or create new services or initiatives, a lack of an ability to transfer data across certain boundaries imposes restrictions on the type and the quality of machine learning models that can be developed and trained.

Training an AI model with distributed data often faces privacy concerns where participants are not willing to share parts of the participant system's data, making the training more difficult.

SUMMARY

According to an embodiment of the present invention there is provided a computer-implemented method for training a federated generative adversarial network (GAN) using private data, said method carried out at an aggregator system having a generator and a discriminator, wherein the aggregator system is in communication with multiple participant systems each having a local feature extractor and a local discriminator, the method comprising: receiving, from a feature extractor at a participant system, a set of features for input to the discriminator at the aggregator system, wherein the features include features extracted from private data that is private to the participant system; and receiving, from one or more local discriminators of the participant systems, discriminator parameter updates to update the discriminator at the aggregator system, wherein the local discriminators are trained at the participant systems.

According to another embodiment of the present invention there is provided a computer-implemented method for training a federated generative adversarial network (GAN) using private data, said method carried out at a participant system having a local feature extractor and a local discriminator, wherein the participant system is in communication with an aggregator system having a generator and a discriminator, the method comprising: training a feature extractor to extract a set of features for input to the discriminator at the aggregator system, wherein the features include features extracted from private data that is private to the participant system; and training a local discriminator to produce discriminator parameter updates to update the discriminator at the aggregator system.

According to another embodiment of the present invention there is provided a training system for a federated generative adversarial network (GAN) using private data, the training system including a processor and a memory configured to provide computer program instructions to the processor to execute the function of the components; the training system including: an aggregator system having a generator and a discriminator with an input collector wherein the input collector is in communication with multiple participant systems each having a local feature extractor and a local discriminator; the input collector including a feature component for receiving, from the feature extractors at participant systems, a set of features for input to the discriminator, wherein the features include features extracted from private data that is private to the participant system; the input collector including a discriminator update component for receiving parameter updates from the local discriminators at participant systems that are trained using local real data and fake data, with the fake data provided by the generator.

According to another embodiment of the present invention there is provided a training system for a federated generative adversarial network (GAN) using private data, the training system including a processor and a memory configured to provide computer program instructions to the processor to execute the function of the components; the training system including: a participant system having a local feature extractor and a local discriminator; where the local feature extractor extracts a set of features for input to the discriminator at the aggregator system, wherein the features include features extracted from private data that is private to the participant system; and where the local discriminator is trained to produce discriminator parameter updates to update the discriminator at the aggregator system.

According to a further embodiment of the present invention there is provided a computer program product for training a federated generative adversarial network (GAN) using private data, the computer program product comprising a computer readable storage medium having program instructions embodied therewith, the program instructions executable by a processor to cause the processor to carry out the method steps of the above embodiments.

The computer readable storage medium may be a non-transitory computer readable storage medium and the computer readable program code may be executable by a processing circuit.

BRIEF DESCRIPTION OF THE DRAWINGS

Embodiments of the present invention will now be described, by way of example only, with reference to the accompanying drawings.

FIG. 2 is a swim-lane flow diagram of an example embodiment of a method in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for training a Generative Adversarial Network (GAN) in a federated manner using private data in a manner that takes into account the privacy concerns of participants. In order to facilitate the training with distributed data divided into private partitions, local feature extractors are provided at each participant system and a training method integrates the local feature extractors with federated GAN training.

In some embodiments, the training of federated GAN models using private data is an improvement in the technical field of artificial intelligence and machine learning and, more particularly, in the technical field of controlling access to data and preserving privacy and security of participating systems.

Figure 1:
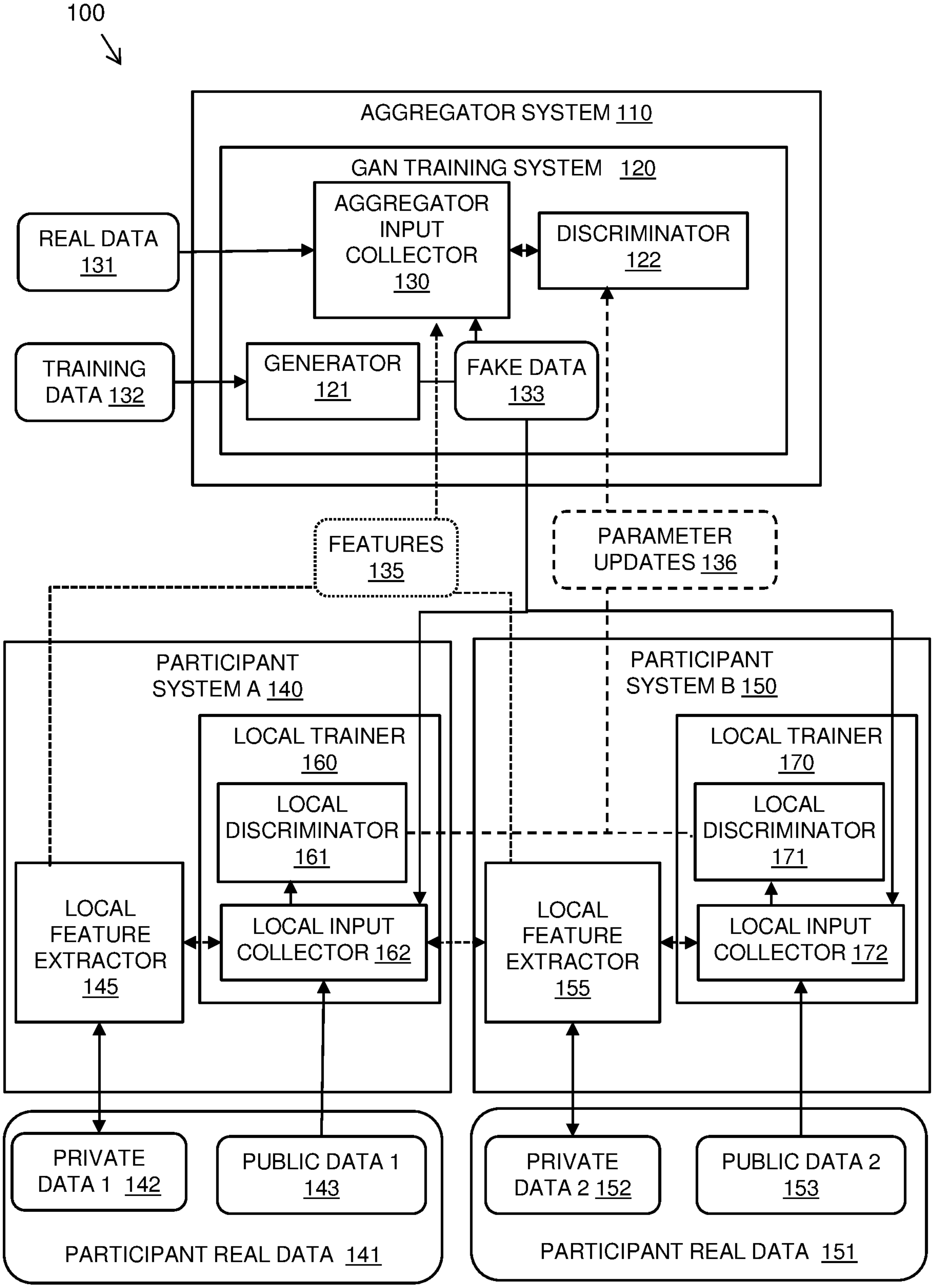
FIG. 1 is a block diagram of an example embodiment of a system in accordance with embodiments of the present invention.

Referring to FIG. 1, an example embodiment is shown of a federated system 100 including an aggregator system 110 with a GAN training system 120 and a plurality of participants systems 140, 150. In FIG. 1, two participating systems 140, 150 are shown for illustration; however, in some embodiments, this may include many more participant systems.

In some embodiments, the described federated system 100 improves the trust in training of a federated GAN model. Federated GAN models are extensively used for data augmentation and synthetic data generation to boost machine learning model performance.

In some embodiments, the GAN training system 120 is a class of machine learning frameworks in which two neural networks contest with each other in a game where one agent's gain is another agent's loss. A first neural network is a generator 121 that, given training data 132 and real data 131, learns to generate new "fake" data 133 with the same statistics as the training data 132. A second neural network is a discriminator 122 that can tell how "realistic" the generated fake data 133 is compared to real data 131. The generator 121 and the discriminator 122 are dynamically updated with feedback. This means that the generator 121 is trained to fool the discriminator 122 and this enables the model to learn in an unsupervised manner.

In some embodiments, the generative network of the generator 121 generates candidates while the discriminative network of the discriminator 122 evaluates them. This contest operates in terms of data distributions. Typically, the generative network learns to map from a latent space to a data distribution of interest, while the discriminative network distinguishes candidates produced by the generator 121 from the true data distribution. The generative network's training objective is to increase the error rate of the discriminative network by producing novel candidates that the discriminator thinks are not synthesized (i.e. are part of the true data distribution).

In the described system, each participant system 140, 150 has its own dataset of participant real data 141, 151 partitioned into shareable public data 143, 153 and private data 142, 152 which is not shared due to privacy concerns. Often the unshared data is special in that it contains many useful features that are very specific and therefore it is important to include this private data in the training. For example, a dataset that only contains images of chairs is perfect for learning chair features.

Each participant system 140, 150 uses its private data 142, 152 and its public data 143, 153 to train a local feature extractor 145, 155 to extract its specific features. In some embodiments, the learning may be done through an unsupervised learning approach (for example, an auto-encoder). The feature representations 135 of the local feature extractors 145, 155 of the participant systems 140, 150 are then collected by an aggregator input collector 130 in a federated GAN training system 120 for training a GAN model. The features of the local feature extractors 145, 155 are also shared between participant systems 140, 150.

In some embodiments, each participant system 140, 150 includes a local trainer 160, 170 including a local input collector 162, 172 feeding input data to a local discriminator 161, 171. The local discriminators 161, 171 are trained on real public data 143, 153 and fake data 133 from the generator 121 of the aggregator system 110 and using features provided from the local feature extractors 145, 155 including features extracted from private data 142, 152. Update parameters 136 are sent from the local discriminators 161, 171 to the discriminator 122 of the aggregator system 110 resulting in the discriminator 122 being updated from the local discriminators' 161, 171 training.

A local input collector 162 at a participant system 140 collects the following data: (1) Real data inputs from the public data 143 of the participant system 140 and, optionally, other participant systems; (2) Fake data produced by the generator 121 at the aggregator system 110; (3) Real and fake features from the local feature extractor 145 of the participant system 140; and (4) Real and fake features from local feature extractors 155 of other participant systems 150.

Participant systems 140, 150 have the participant system's own local feature extractors 145, 155 trained separately using the participant system's private data and the participant system's public data. The feature extractor 145, 155 is only used as a service to a local trainer 160, 170. The feature extractor 145, 155 only exposes its service call and produces output. The local trainer 160, 170 has a local discriminator 161, 171 which is trained with input provided by the local input collector 162, 172. The local input collector 162, 172 passes real and faked data to the feature extractor 145, 155, gets features and combines them, and passes the result to the local discriminator 161, 171 for its training.

In some embodiments, in the described method and system, an aggregator input collector 130 combines the feature representations 135 of the local feature extractors 145, 155 from the participant systems 140, 150 into the discriminator 122 of the GAN training system 120.

In some embodiments, the aggregator system 110 has its own data for the GAN trainer system 120 to train the generator 121 on. The GAN trainer system 120 aggregates training results of the local discriminators 161, 171 collected from participant systems 140, 150. The GAN trainer system 120 also updates the aggregated results to local trainers 160, 170 on participant systems 140, 150.

Referring to FIG. 2, a swim-lane flow diagram 200 shows an example embodiment of a method of carried out in the federated system 100 with method at each participant system 210 and at an aggregator system 220.

In some embodiments, each participant system 210 trains 211 the participant system's local feature extractor over the participant system's respective partitions of real private and public data real data. This may use techniques such as auto-encoders.

In some embodiments, an auto-encoder is a neural network that is trained to attempt to copy its input to its output.

The design of the auto-encoder model purposefully makes this challenging by restricting the architecture to a bottleneck at the midpoint of the model, from which the reconstruction of the input data is performed. Once the model is fit, the reconstruction aspect of the model can be discarded and the model up to the point of the bottleneck can be used. The output of the model at the bottleneck is a fixed-length vector that provides a compressed representation of the input data as a feature extraction.

In some embodiments, the generator at the aggregator system 220 is used to produce 221 fake data. As used herein, fake data includes data that was not gathered from "actual" real world events but was instead fabricated (e.g., by a data scientists, or by a data generation program managed by a data scientist) to replicate characteristics of data that would have been gathered at respective real world events. The aggregator system 220 passes 222 copies of the fake data to all the participant systems 210. The participant systems 210 obtain 212 a copy of the fake data from the aggregator system 220.

In some embodiments, the participant systems 210 use 213 the participant system's local feature extractor 145 to obtain features for all the collected data. The collected data includes: the participant system's real data in the form of the private partition data and the public partition data, and fake data from the aggregator. The extracted features are passed 214 to the aggregator system 220. The extraction of the features is the only use that is made of the private data so that privacy is maintained.

In some embodiments, the aggregator system 220 receives and combines 223 the output of all the local feature extractors 145, 155 after each of them has extracted features. This includes the features extracted for the fake data produced by the generator. The features are used as inputs to the discriminator at the aggregator system 220.

In some embodiments, the feature representations of the local datasets are shared 215 between the participant systems 210 to improve the training of all the local trainers 160, 170. This includes the feature representations extracted from the private and/or public datasets. The participant systems 210 use 216 the feature representations to update the participant system's local discriminator 161, 171.

In some embodiments, gradients from the local discriminators that are obtained by feeding features into the local discriminators are dispatched 217 from the participant systems 210 to the aggregator system 220. The aggregator system 220 updates 224 the generator with the gradients obtained from the local discriminators. This provides feedback on training from the local discriminators to the generator at the aggregator system.

In some embodiments, the participant systems 210 dispatch 218 local discriminator parameter updates to the aggregator system 220. The discriminator parameter updates are typically a set of weights. The aggregator system 220 updates 225 the discriminator 122 at the GAN training system 120 with the discriminator parameter updates. The aggregator system 220 combines the discriminator parameter updates and broadcasts 226 the combined parameters to all participant systems 210 to update all the local discriminators.

In some embodiments, optionally, the aggregator system 220 may also train the GAN discriminator at the aggregator level if some real data is available to the aggregator. In a typical GAN training step scenario, the discriminator outputs which determine whether an input to the discriminator is real or not is compared to those inputs it was given that were real and not fake. This is a way of determining how many times the discriminator misclassifies a real input as being fake. With this feedback information, the discriminator can be improved. If the aggregator system 220 has some real data, then it can be used as an input to the aggregator discriminator 122 as a training process in addition to the parameter updates to the discriminator 122 provided by the local discriminators.

Figure 3:
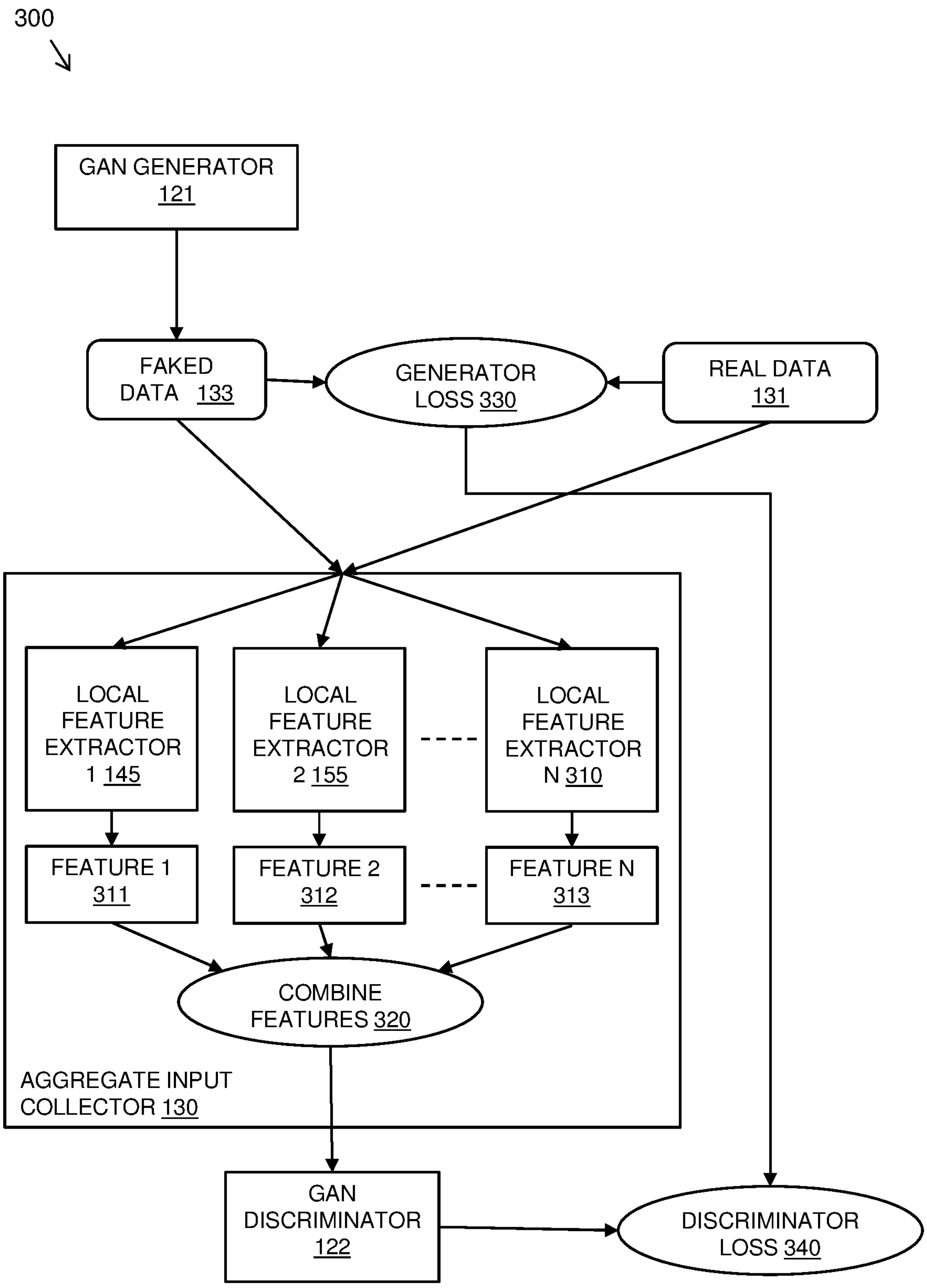
FIG. 3 is a schematic diagram of an example embodiment of an aspect of a method in accordance with embodiments of the present invention.

FIG. 3 shows a schematic diagram 300 of a GAN network model that has been trained by federated participant systems each with local feature extractors 145, 155, 310.

In some embodiments, the GAN generator 121 receives training data as input and produces faked data 133 as output so that faked data 133 looks like real data as much as possible. The GAN generator 121 may use the public real data 143, 153 from the participating systems 140, 150, but it would be better for the GAN generator 121 to receive a different dataset of real data if possible. The GAN generator 121 optimizes the generator loss 330 function which consists of a comparison between real data 131 and faked data 133.

In some embodiments, the GAN trainer system 120 aggregates training results of local discriminators 161, 171 collected from participant systems 140, 150.

In some embodiments, the aggregator input collector 130 obtains features 311, 312, 313 from the local feature extractors 145, 155, 310 and combines 320 the features for use in the GAN discriminator 122 when classifying the real data 131. The generator loss 330 is compared with the discriminator loss 340 for the real data 131.

In some embodiments, the GAN discriminator 122 receives real data 131 and faked data 133 generated by the GAN generator 121. All of the data is passed through feature extractor modules of the participant systems to get a set of features 311, 312, 313 which are then combined as inputs into the GAN discriminator 122 which is a classifier. The GAN discriminator 122 classifies whether an input data is real or faked. The accuracy of the classifier is obtained by training the discriminator with the discriminator loss 340.

FIG. 3 illustrates an example embodiment of the method from the point of view of the aggregator system 110 training its own GAN model. To do so, the aggregator system 110 requires the output of each of the local feature extractors 145, 155 so as to update the parameters of the GAN discriminator 122 discriminator. Since the aggregator system 110 does not have any feature extractor, any data that it passes to the GAN discriminator 122 must have been processed by all the participants' local feature extractors 145, 155.

Figure 4:
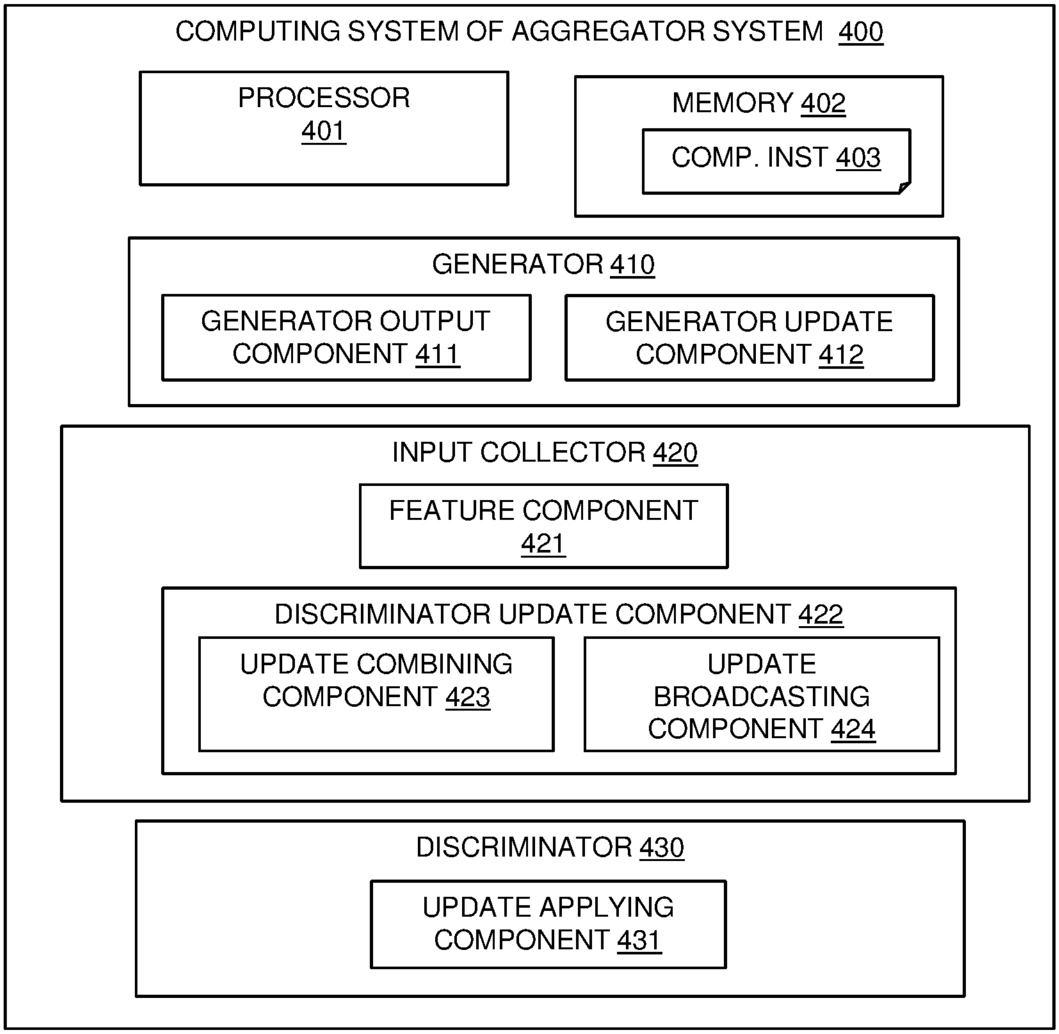
FIG. 4 is block diagram of an example embodiment of a system in accordance with embodiments of the present invention.

Referring to FIG. 4, a block diagram shows a computing system of an example embodiment of an aggregator system 400. The computing system may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

In some embodiments, the aggregator system 400 has a generator 410 and a discriminator 430 with an input collector 420 wherein the input collector 420 is in communication with multiple participant systems each having a local feature extractor and a local discriminator.

In some embodiments, the input collector 420 may include a feature component 421 for receiving, from the feature extractors at participant systems, a set of features for input to the discriminator. The features include features extracted from private data that is private to the participant system.

In some embodiments, the input collector 420 may include a discriminator update component 422 for receiving parameter updates from the local discriminators at participant systems that are trained using local real data and fake data, with the fake data provided by the generator 410.

In some embodiments, the discriminator update component 422 may include an update combining component 423 for combining discriminator parameter updates from multiple participating systems and an update broadcasting component 424 for broadcasting combined parameter updates to the local discriminators at the participating systems. The discriminator 430 may include an update applying component 431 for applying the received parameter updates to the discriminator 430.

In some embodiments, the generator 410 may include a generator output component 411 for passing fake data generated by the generator to the participant systems for input to the local discriminators and a generator update component 412 for updating the generator with gradients obtained by feeding features into the local discriminators.

Figure 5:
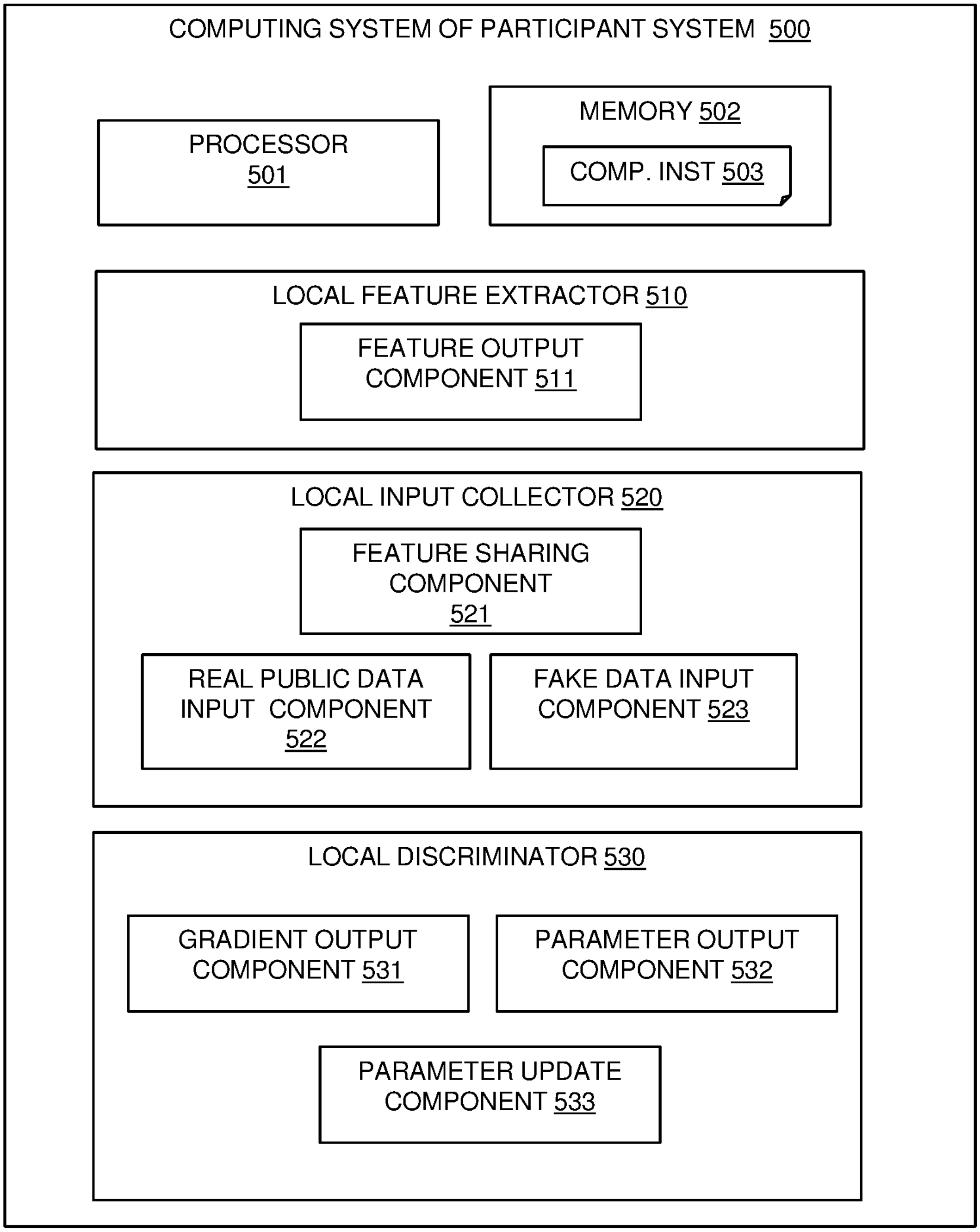
FIG. 5 is block diagram of an example embodiment of a system in accordance with embodiments of the present invention.

Referring to FIG. 5, a block diagram shows a computing system of an example embodiment of a participant system 500. The computing system may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

In some embodiments, the participant system 500 has a local feature extractor 510 and a local discriminator 530. The local feature extractor 510 extracts a set of features for input to the discriminator at the aggregator system and includes a feature output component 511. The features include features extracted from private data that is private to the participant system 500.

In some embodiments, the local feature extractor 510 includes receiving fake data generated by the generator at the aggregator system for input and the set of features include real features extracted from public and private data of participating systems and fake features extracted from fake data from the generator at the aggregator system.

In some embodiments, the local discriminator 530 is trained to produce discriminator parameter updates to update the discriminator at the aggregator system. The participant system 500 includes a local input collector 520 including a feature sharing component 521 for sharing features between participant systems for training the local discriminators. The local input collector 520 includes a real public data input component 522 for receiving inputs for the local discriminator 530 of real public data of the participant systems and a fake data input component 523 for receiving fake data from generator at the aggregator system.

In some embodiments, the local discriminator 530 includes a gradient output component 531 for sending gradients obtained by feeding features into the local discriminators to the generator at the aggregator system.

In some embodiments, the local discriminator 530 includes a parameter output component 532 for outputting updated parameters for update of the discriminator at the aggregator system and a parameter update component 533 for receiving combining discriminator parameter updates from the aggregator system for updating the local discriminator.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
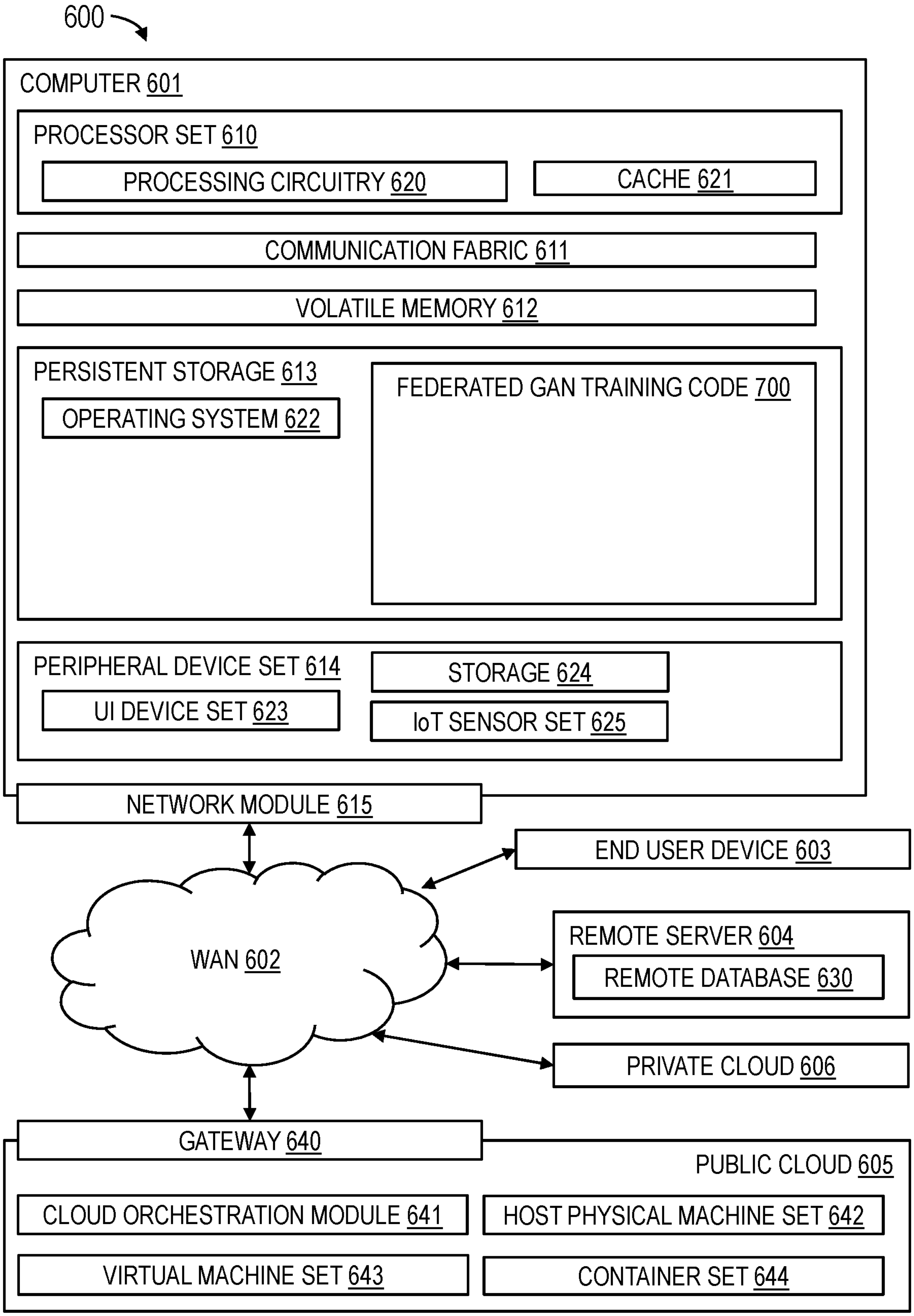
FIG. 6 is a block diagram of an example embodiment of a computing environment for the execution of at least some of the computer code involved in performing the present invention.

Referring to FIG. 6, computing environment 600 contains an example of an environment for the execution of at least some of the computer code involved in performing the inventive methods, such as federated generative adversarial network training code 700. In addition to block 700, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 700, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 700 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 700 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method, the method comprising:

training a federated generative adversarial network (GAN) using private data using an aggregator system having a generator and a discriminator, wherein the aggregator system is in communication with multiple participant systems each having a local feature extractor and a local discriminator, wherein the training includes:

training, using an auto-encoder model and an unsupervised learning approach, the local feature extractor at each of the multiple participant systems to extract a set of features for input to the discriminator at the aggregator system, wherein the features include features extracted from the private data that is private to each of the participant systems, wherein an output of the auto-encoder model is a fixed-length vector at a bottleneck providing a compressed representation of input data as a feature extraction;

training the local discriminator at each of the participant systems to produce discriminator parameter updates to update the discriminator at the aggregator system, wherein the training of the local discriminator includes sharing the features extracted from the private data between participant systems, real public data of the participant systems and received fake data generated at the generator of the aggregator system for training each of the local discriminators;

receiving, from the local feature extractor at a participant system of the multiple participant systems, a set of features for input to the discriminator at the aggregator system, wherein the features include the feature extraction including the compressed representation of the input data from each of the multiple participant systems extracted from the private data that is private to each of the participant systems, real public data of participating systems, and the fake data generated at the generator of the aggregator system;

receiving, from one or more local discriminators of the multiple participant systems, the discriminator parameter updates to update the discriminator at the aggregator system, wherein the one or more local discriminators are trained at the participant systems;

combining the discriminator parameter updates from each of the multiple participant systems; and broadcasting combined parameter updates to the local discriminators at each of the multiple participant systems.

2. The method as claimed in claim 1, further comprising updating the generator at the aggregator system with gradients obtained by feeding the features into the local discriminators.

3. The method of claim 1, including receiving inputs at the local discriminator of the real public data of the participant systems and the fake data from the generator at the aggregator system.

4. The method as claimed in claim 1, including sending gradients obtained by feeding the features into the local discriminators to the generator at the aggregator system.

5. The method of claim 1, including receiving the fake data generated by the generator at the aggregator system for the input to the local feature extractor and wherein the set of features include real features extracted from public and private data of the participating systems and fake features extracted from the fake data from the generator at the aggregator system.

6. The method as claimed in claim 1, including:

receiving combining discriminator parameter updates from the aggregator system for updating the local discriminator.

7. The method of claim 1, wherein the generator of the aggregator system optimizes a generator loss function based on a comparison of real data and the fake data, wherein the generator loss is compared to a discriminator loss for the real data, wherein the real data and the fake data is passed through the local feature extractor at the participant system and the features combined as inputs for the discriminator which is a classifier, and wherein an accuracy of the classifier is obtained by training the discriminator with the discriminator loss.

8. The method of claim 1, wherein the feature extractions from each of the multiple participant systems are shared between the multiple participant systems and utilized to update the local discriminator of each of the participant systems and improve the training.

9. The method of claim 1, further comprising:

providing feedback on the training to the generator of the aggregator system using gradients received from the local discriminator of each of the participant systems.

10. The method of claim 1, wherein the discriminator parameter updates are a set of weights combined from each of the multiple participant systems.

11. A computer system comprising:

a processor set;

one or more computer-readable storage media; and program instructions stored on the one or more computer-readable storage media to cause the processor set to perform operations comprising:

training a federated generative adversarial network (GAN) using private data using an aggregator system having a generator and a discriminator, wherein the aggregator system is in communication with multiple participant systems each having a local feature extractor and a local discriminator, wherein the training includes:

training, using an auto-encoder model and an unsupervised learning approach, the local feature extractor at each of the multiple participant systems to extract a set of features for input to the discriminator at the aggregator system, wherein the features include features extracted from the private data that is private to each of the participant systems, wherein an output of the auto-encoder model is a fixed-length vector at a bottleneck providing a compressed representation of input data as a feature extraction;

training the local discriminator at each of the participant systems to produce discriminator parameter updates to update the discriminator at the aggregator system, wherein the training of the local discriminator includes sharing the features extracted from the private data between participant systems, real public data of the participant systems and received fake data generated at the generator of the aggregator system for training each of the local discriminators;

receiving, from the local feature extractor at a participant system of the multiple participant systems, a set of features for input to the discriminator at the aggregator system, wherein the features include the feature extraction including the compressed representation of the input data from each of the multiple participant systems extracted from the private data that is private to each of the participant systems, real public data of participating systems, and the fake data generated at the generator of the aggregator system;

receiving, from one or more local discriminators of the multiple participant systems, the discriminator parameter updates to update the discriminator at the aggregator system, wherein the one or more local discriminators are trained at the participant systems;

combining the discriminator parameter updates from each of the multiple participant systems; and broadcasting combined parameter updates to the local discriminators at each of the multiple participant systems.

12. A computer program product comprising:

one or more computer-readable storage media; and program instructions stored on the one or more computer-readable storage media to perform operations comprising:

training a federated generative adversarial network (GAN) using private data using an aggregator system having a generator and a discriminator, wherein the aggregator system is in communication with multiple participant systems each having a local feature extractor and a local discriminator, wherein the training includes:

training, using an auto-encoder model and an unsupervised learning approach, the local feature extractor at each of the multiple participant systems to extract a set of features for input to the discriminator at the aggregator system, wherein the features include features extracted from the private data that is private to each of the participant systems, wherein an output of the auto-encoder model is a fixed-length vector at a bottleneck providing a compressed representation of input data as a feature extraction;

training the local discriminator at each of the participant systems to produce discriminator parameter updates to update the discriminator at the aggregator system, wherein the training of the local discriminator includes sharing the features extracted from the private data between participant systems, real public data of the participant systems and received fake data generated at the generator of the aggregator system for training each of the local discriminators;

receiving, from the local feature extractor at a participant system of the multiple participant systems, a set of features for input to the discriminator at the aggregator system, wherein the features include the feature extraction including the compressed representation of the input data from each of the multiple participant systems extracted from the private data that is private to each of the participant systems, real public data of participating systems, and the fake data generated at the generator of the aggregator system;

receiving, from one or more local discriminators of the multiple participant systems, the discriminator parameter updates to update the discriminator at the aggregator system, wherein the one or more local discriminators are trained at the participant systems;

combining the discriminator parameter updates from each of the multiple participant systems; and broadcasting combined parameter updates to the local discriminators at each of the multiple participant systems.

* * * * *